No. 711,009. Patented Oct. 14, 1902.
D. T. SHARPLES.
APPARATUS FOR TEMPERING CREAM, &c.
(Application filed May 9, 1901. Renewed Sept. 12, 1902.)
(No Model.) 2 Sheets—Sheet 1.

Witnesses
Inventor
David T. Sharples
by
Attorney

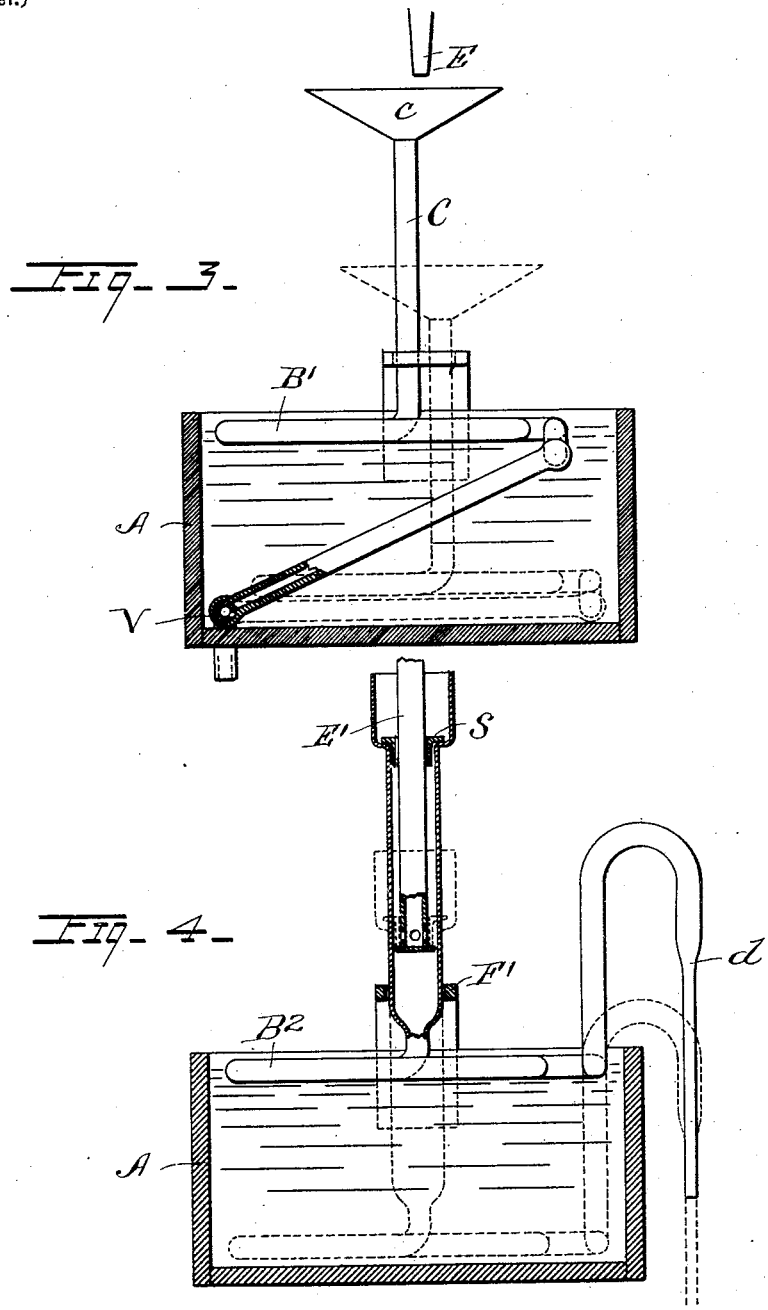

UNITED STATES PATENT OFFICE.

DAVID TOWNSEND SHARPLES, OF WESTCHESTER, PENNSYLVANIA.

APPARATUS FOR TEMPERING CREAM, &c.

SPECIFICATION forming part of Letters Patent No. 711,009, dated October 14, 1902.

Application filed May 9, 1901. Renewed September 12, 1902. Serial No. 123,121. (No model.)

*To all whom it may concern:*

Be it known that I, DAVID TOWNSEND SHARPLES, a citizen of the United States of America, and a resident of Westchester, in the county of Chester and State of Pennsylvania, have invented certain new and useful Improvements in Apparatus for Tempering Cream, &c., of which the following is a specification.

My invention relates particularly to the tempering of cream or milk, though applicable to other uses involving the mere agitation of the liquid operated on.

Heretofore the body of liquid to be tempered has been cooled or heated, as the case may be, by a continuous or intermittent flow of cold or warm water through pipes fixedly immersed in the vat, and inasmuch as these fixed pipes would not naturally temper the whole body of stored liquid uniformly they have also been arranged so as to be capable of swinging in the vat, and have been so swung during the passage of the tempering liquid through them by means of a suitable driving mechanism operatively connected thereto, thus constantly changing the position of the pipes in the stored fluid and also keeping the latter sufficiently agitated or stirred to secure an approximately uniform effect upon the whole mass.

The main object of my invention is to secure the advantages referred to in the latter construction while at the same time retaining the simplicity of the construction first mentioned and providing an automatic and advantageous method of operation dependent solely upon the inflowing stream of liquid.

The invention is fully described in connection with the accompanying drawings, illustrating a simple mechanism adapted to carry the same into effect.

Figure 1:
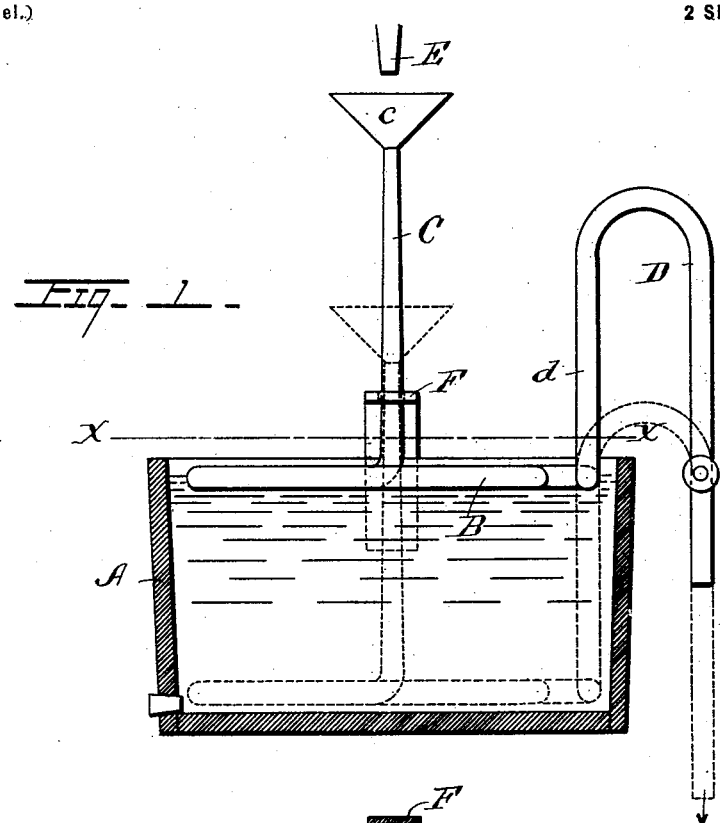
Figure 2:
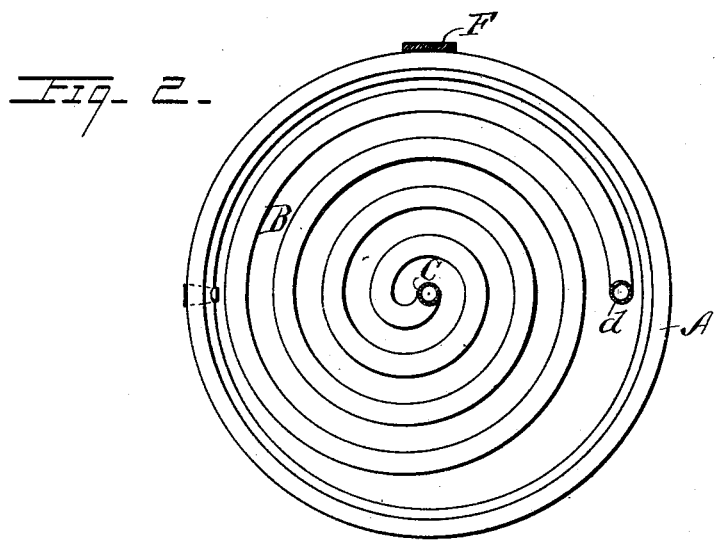

Figure 1 is a partly-sectional elevation showing the movable coil or receptacle hereinafter referred to in floating position and indicating in dotted lines the sunken position of the same. Fig. 2 is a sectional plan view taken on the line *x x* of Fig. 1. Figs. 3 and 4 show slightly-modified forms of mechanism.

A represents a storage vessel or vat of any desired form for the liquid to be cooled or heated or stirred, as the case may be.

B is the floating receptacle for the tempering or passing liquid, which is preferably made up of coiled pipe to such size and form as to loosely fit within the walls of the vat and freely rise and fall therein and of such displacement as to cause the same to normally float upon the stored liquid, but to sink therein when it is filled to a greater or less extent by the inflowing liquid. The latter is supplied to the coil through a vertical feed-pipe. This feed-pipe C extends to a greater height above the coil B than the depth of the vat and is formed with a funnel-shaped top *c*, which is arranged directly below a fixed supply-nozzle E, through which the inflowing liquid is delivered, so as to receive the latter in all positions of the vertically-movable receptacle, a fixed guide-bearing F being preferably provided to insure the maintenance of the funnel-top *c* in receiving position beneath the nozzle E in all positions of the receptacle with which the pipe C rises and falls.

The tempering coil or receptacle B is preferably provided also with a siphon extension D, the short branch *d* of which is higher than the depth of the vat, though not so high as the feed-pipe C, so as to permit the coil to freely sink to the bottom of the vat while the long discharging branch freely depends outside of the latter. The discharging capacity of the siphon D is greater than the inflow through the feed-pipe C, and suitable cocks may be provided to regulate the relative inflow through the nozzle E and the outflow through the siphon when the latter operates as will now be described.

When the empty coil or receptacle B is laid flat upon the body of cream or other liquid in the vat, it will float thereon until the supply of inflowing liquid fed thereto through the nozzle E and feed-pipe C has sufficiently increased its weight, when it will sink through the body of the liquid to the bottom of the vat. The continued inflow of liquid will then fill the coil and rise in the pipe C and siphon D until the latter is caused to operate, when the coil will gradually empty, owing to the discharge capacity of the siphon being greater than the inflowing stream, as previously stated. This emptying of the coil finally causes it to automatically rise again to the surface of the stored liquid to be again filled and sunken as before, the automatic filling and emptying and the resulting rising and falling of the coil B being automatically continued so long as the stream of inflowing liquid is continued, with the obvious effect of stirring or agitating the whole body of stored liquid and uniformly tempering the same as desired.

It will thus be seen that the stirring or agitation of the liquid to be treated, which is required to secure uniformity of action upon the whole body of liquid, is automatically effected directly and continuously by the mere passage of the inflowing liquid through the movable receptacle therefor, causing the alternate filling and emptying and corresponding fall or rise of said receptacle, as described.

The particular mechanism shown for carrying out my invention may of course be readily modified. For instance, in Fig. 3 of the drawings the siphon is dispensed with and the liquid is withdrawn from the sunken receptacle by means of a suitable valve V at the bottom of the vat, which is closed when the coil or receptacle B' is floating on the stored liquid, but widely opened when the receptacle has been filled and sunken to the bottom, so as to quickly empty the same, and thus cause it to automatically rise again. In Fig. 4 the inflow is shown to be automatically cut off by the sinking of the receptacle B², which carries a loose sleeve S, adapted to cover or uncover the discharge-openings from the supply-pipe E', so that a smaller siphon d' will serve to empty the filled receptacle and cause it to automatically rise again.

It will be understood that my invention is adapted not only to effect automatically the tempering of a stored body of liquid as primarily intended, but also to effect automatically the stirring or agitation of a stored body of liquid without changing its temperature, if so desired, the relative temperature of the passing liquid determining whether or not the tempering effect is produced.

What I claim is—

1. The combination with a liquid-storage vessel of a liquid-receptacle therein arranged to communicate with a supply-nozzle and having a displacement greater than its unloaded weight and less than its loaded weight, and an automatic emptying mechanism for said receptacle whereby the latter is caused to alternately rise and fall in the stored liquid.

2. An apparatus for tempering or agitating a stored liquid consisting of a vat, a floating coil or receptacle having a siphon extension and a feed-pipe extension of greater height than said siphon, and a supply-nozzle for said feed-pipe, said coil being free to rise and fall in a body of liquid contained in the vat while maintaining communication with said supply-nozzle and having a displacement greater than its unloaded weight.

Signed at Westchester, Pennsylvania, this 3d day of May, 1901.

DAVID TOWNSEND SHARPLES.

Witnesses:
WALTON F. COMFORT,
H. S. LIMBERGER.